(12) United States Patent
Startchik

(10) Patent No.: US 11,345,421 B2
(45) Date of Patent: May 31, 2022

(54) ZIPPERTANK MOBILITY VEHICLE

(71) Applicant: Sergei Startchik, Geneva (CH)

(72) Inventor: Sergei Startchik, Geneva (CH)

( * ) Notice: Subject to any disclaimer, the term of this patent is extended or adjusted under 35 U.S.C. 154(b) by 464 days.

(21) Appl. No.: 16/466,538

(22) PCT Filed: Nov. 29, 2017

(86) PCT No.: PCT/IB2017/001476
§ 371 (c)(1),
(2) Date: Jun. 4, 2019

(87) PCT Pub. No.: WO2018/104770
PCT Pub. Date: Jun. 14, 2018

(65) Prior Publication Data
US 2019/0291794 A1 Sep. 26, 2019

(30) Foreign Application Priority Data

Dec. 5, 2016 (WO) .................. PCT/IB2016/001732

(51) Int. Cl.
*B62D 55/22* (2006.01)
*B60K 26/02* (2006.01)
(Continued)

(52) U.S. Cl.
CPC .............. *B62D 55/22* (2013.01); *B60K 26/02* (2013.01); *B60Q 1/02* (2013.01); *B62D 51/02* (2013.01);
(Continued)

(58) Field of Classification Search
CPC ...... B62D 55/22; B62D 51/02; B62D 55/065; B62D 55/075; B62D 55/205; B60K 26/02
(Continued)

(56) References Cited

U.S. PATENT DOCUMENTS

| 1,868,148 A | * | 7/1932 | McMillan | ............... | B62D 55/20 |
| | | | | | 305/47 |
| 2,371,802 A | * | 3/1945 | Chriswell | ............... | B62D 55/22 |
| | | | | | 305/48 |

(Continued)

FOREIGN PATENT DOCUMENTS

WO 1999/21749 5/1999

*Primary Examiner* — Minnah L Seoh
*Assistant Examiner* — Harold Eric Pahlck, III
(74) *Attorney, Agent, or Firm* — Dinsmore & Shohl LLP; Weston R. Gould

(57) ABSTRACT

Current invention corresponds to a mobility vehicle that draws its properties from a special kind of a track that can change its rigidity. The track can become rigid on its lower part corresponding to a wheel shape with large diameter or become totally flexible as usual track on upper side for practical use. When rigid, the track correspond to circular wheel and thus plays a role of a wheel in contact with the ground. The upper part of the track remains flexible and allows to use space above a the track for practical reasons. More particularly, the invention relates to a mobile system including variable flexibility track and at least two rollers around which the variable flexibility track is wrapped, wherein the rollers are adapted to change the rigidity and the curvature of the track to adapt its shape to different functionalities as being a wheel or having a part of circular wheel with different curvature or being foldable. The variable flexibility track is composed of track elements and hinges linking the track elements so as to allow rotation of the track elements with respect to each other around the hinges. Each track element bears a locking mechanism that allows a rigid positioning of the track elements with respect to the adjacent ones at various angles. The rollers are in contact with the variable flexibility track and can contain mechanisms to lock a track elements thus changing track rigidity and/or mechanisms to change track curvature. The tracks also play a role (Continued)

of shock absorbers and bear mechanisms to perform turning of the vehicle by applying different speed and/or curvature to the tracks.

10 Claims, 15 Drawing Sheets

(51) Int. Cl.
*B60Q 1/02* (2006.01)
*B62D 51/02* (2006.01)
*B62D 55/065* (2006.01)
*B62D 55/075* (2006.01)
*B62D 55/205* (2006.01)

(52) U.S. Cl.
CPC ......... *B62D 55/065* (2013.01); *B62D 55/075* (2013.01); *B62D 55/205* (2013.01)

(58) Field of Classification Search
USPC ..................................................... 305/45, 47
See application file for complete search history.

(56) References Cited

U.S. PATENT DOCUMENTS

| | | | |
|---|---|---|---|
| 2,462,643 A | | 2/1949 | Johnson et al. |
| 3,056,633 A | | 10/1962 | Lucas |
| 3,179,431 A | * | 4/1965 | Pikl .................. A61G 5/061 |
| | | | 280/5.2 |

* cited by examiner

ZIPPERTANK MOBILITY VEHICLE

FIELD OF THE INVENTION

The present invention relates to a mobility vehicle similar to bicycle, scooter, motorcycle, segway, wheelchair, scooter for elderly or recent class of "rideable vehicles". It could be also a multi-person vehicle similar to a car with high off-road drivability, cross-country agility, traction in deep snow or sand.

BACKGROUND OF THE INVENTION

Mobility vehicles are mostly based on wheels for their simplicity of operation and low maintenance costs. One of paramount properties of a wheel is their drivability necessary to go beyond obstacles and provide smooth motion to the vehicle and passengers. It is common knowledge that bigger the wheel diameter, bigger the drivability and off-road performance. Some heavy-duty vehicles like tractors have wheels that are sometimes almost as high as the vehicle itself for guaranteeing traction in wet soil, dirt, swamps, stairs slopes or the like. So, the bigger the wheel, the better the wheel. However, bigger is the wheel, less comfortable it is for example for entering a parking, for driver visibility or for entering the vehicle).

At the end of $19^{th}$ century one variant of a motorcycle was invented with only one wheel of more than 2 meters of diameter and a driver was positioned within the wheel. But it was not comfortable because of limited visibility for driver. Therefore, size of the wheels we see on existing vehicles do correspond to a compromise between a wish to have larger diameter and numerous constraints of comfort, cost, maintenance, etc.

There is therefore a need for a new type of wheel that could provide both the comfort of a law diameter wheel and the drivability of a high diameter wheel.

With this invention, we discovered a solution that allows to have comparatively big effective wheel radius (up to several meters) for personal mobility vehicle. At the same time, this radius does not alter the comfort of mobility vehicle use. Also, our invention allows to have a variable wheel radius which is very suitable for turning, climbing stairs at certain speed and going beyond obstacles.

BRIEF DESCRIPTION

Current invention corresponds to a mobility vehicle that draws its properties from a special kind of a track that can change its rigidity. It can become rigid with fixed form and curvature corresponding to a wheel shape with large diameter on lower side of the track or totally flexible as usual track on upper side to not create problems with its practical use.

In a normal wheel only lower part is actually "used" during its operation. This part is in contact with the ground at each moment of time and corresponds to 30% of its circumference. The remaining 70% of the wheel is a "price to pay" and, in a sense, not used during motion.

The suggested track adapts to this situation by changing the rigidity of the track so as be in a rigid mode in its lower part and in a flexible mode in its upper part. When rigid, the track correspond to circular wheel and thus plays a role of a wheel in contact with the ground. The upper part of the track is changed to flexible mode and allows to use space above the track for practical reasons (motor, platform passenger space). Changing from flexible to rigid state of the track and back is mechanically similar to respectively zipping and unzipping thus inspiring the name of the vehicle.

More particularly, the invention relates to a mobile system including variable flexibility track and at least two rollers around which the tariable flexibility track is wrapped, wherein the rollers are adapted to change the rigidity and the curvature of the track to adapt its shape to different functionalities as being a wheel or having a part of circular wheel with different curvature or being foldable. The said variable flexibility track being composed of:

- track elements and hinges linking said track elements so as to allow rotation of the track elements with respect to each other around the hinges, and
- a locking mechanism on each track elements that allows a rigid positioning of the track elements with respect to the adjacent ones at various angles said rollers being in contact with the Variable flexibility track 2 and comprising at least one of
- a mechanism that interacts with locking mechanism to change the rigidity of the track that can be present within the track, within rollers,
- a mechanism to change curvature, relative position of tracks or steps of the platform to allow navigation on stairs and cross other obstacles.
- a mechanism for turning by applying different speed and/or curvature to the tracks.

The whole system playing a role of propulsion system, but also to play a role of amortisseurs and compact.

DISCLOSURE OF PREFERRED EMBODIMENTS

Figure 1:
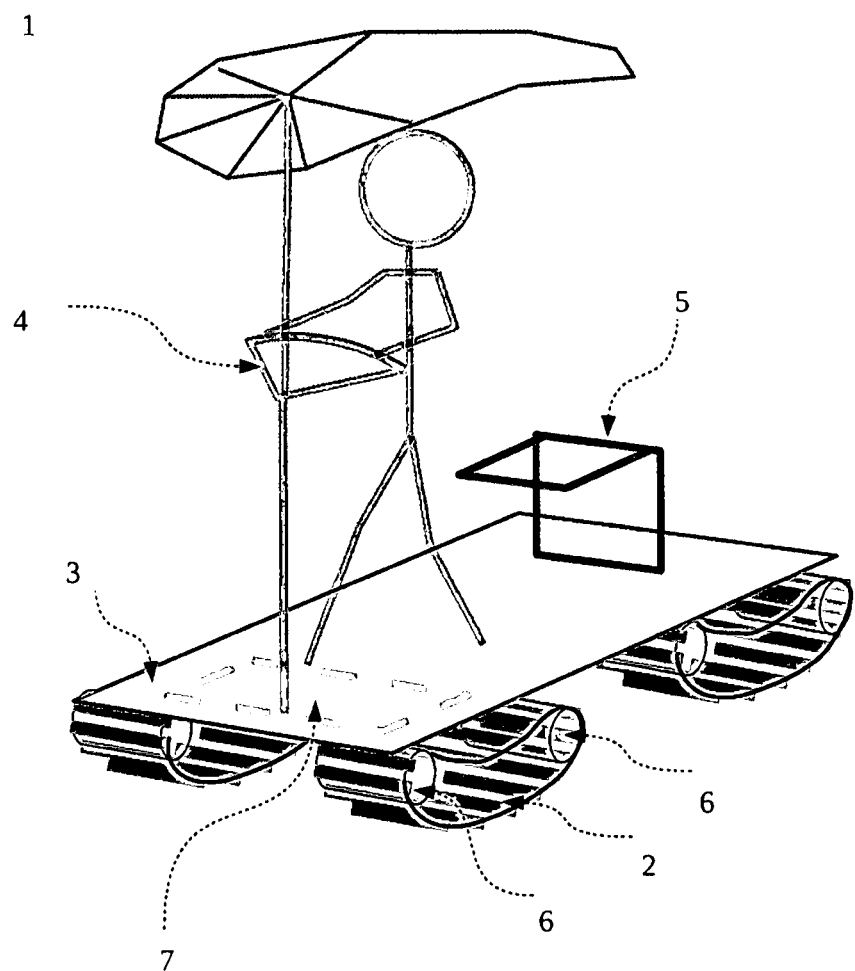
FIG. 1 is a general view of an embodiment of the invention.

The general view of a Personal mobility vehicle 1 is presented on FIG. 1 in one of its general embodiments. The vehicle relies on a Standing platform 3, a Guiding device 4, Optional seat 5 and Motor or pedals 7. Its main part is composed of Variable flexibility tracks 2 in contact with the ground.

Controlling rollers 6 can change the track's rigidity from flexible to rigid and back. They can also change the track's curvature. Mobile vehicle lean on the tracks with Controlling rollers 6. The radius of a "wheel part" of the track curvature can be varied by the Controlling rollers 6 for example by the distance between those rollers. Most of the functionality is provided by those tracks and rollers.

Figure 2:
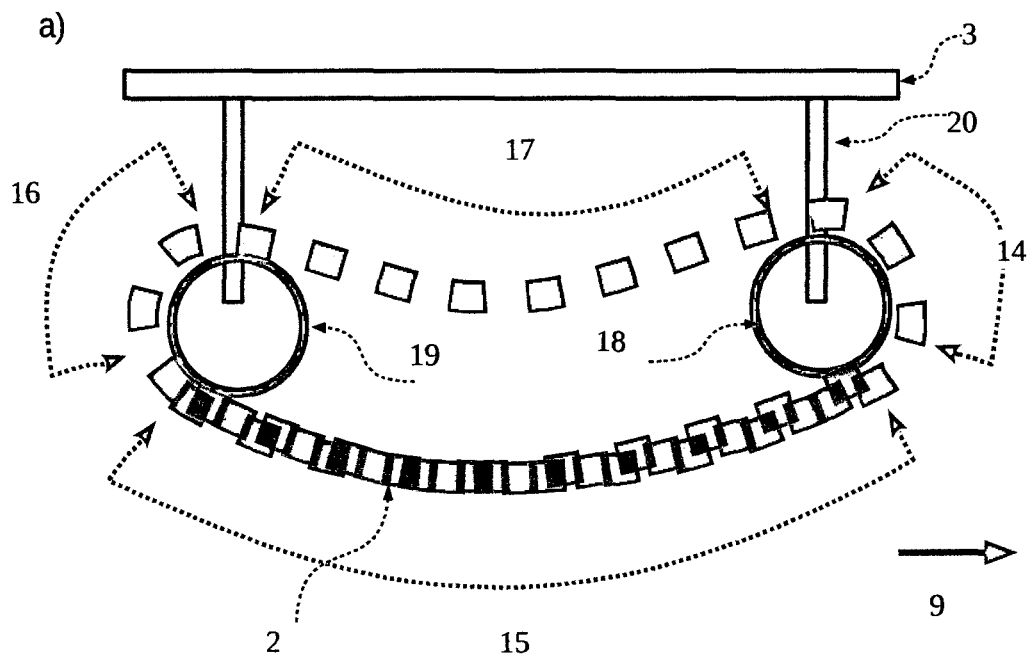
FIGS. 2a and 2b illustrate a global principle of a track according to an embodiment of the invention.
Figure 2:
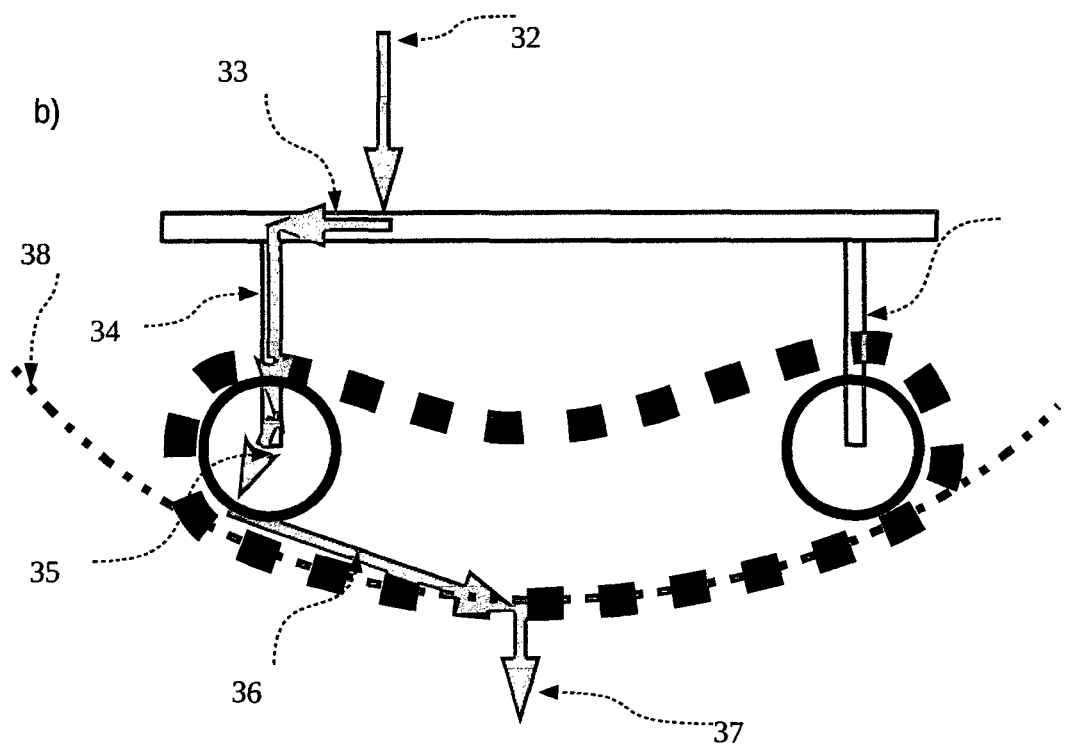

The Standing platform 3 and the Variable flexibility tracks 2 are presented more in detail in FIG. 2a that illustrates the principle of the invention. The Direction of motion 9 indicates the possible direction in which the vehicle advances. The Variable flexibility track 2 has four consecutive states of operation. The first state is a Locking mechanism 14 is where the track is switched from a flexible to a rigid state and remains in the rigid state. The operation of switching is performed by the Controlling roller 18 in locking mode (when rotating clockwise).

The track remains rigid during the second state which is a Rigid state 15 where it plays a role of a wheel and is essential to the operation of the vehicle. Afterwards, the track enters into the third state which is an Unlocking state 16 where the operation of switching is done by Controlling roller 19 in unlocking mode where the track is switched back from a rigid state to a flexible state and continues in the fourth an last state which is the Flexible state 17, and so on. In reverse motion the roles of rollers is inversed.

The principle of the forces that operates on the vehicle with tracks is reflected on FIG. 2b. When a Weight 32 is present on the platform, this weight is distributed across the platform's Elasticity 33. Then, the weight is transmitted down through a Pressure 34 on supports of the rollers to rollers axes and then to rollers outer surface by Rolling pressure 35 similarly to a skateboard. The force thus goes from the rollers to the tracks and is transmitted by the Rolling pressure 35. Then the force is transmitted by a Rigid track elasticity 36 and then by a Pressure 37 to the ground. Summarizing up, the tracks are in contact with the platform at two points of the rollers. As if a skateboard was rolling inside a big wheel with a Radius of effective wheel 38 formed by a track.

Some interesting properties of the invention derive from a combination of multiple new features. The first one is a track locking mechanism that can be realized in various embodiments which will be shown in detail below. The second is a roller that plays both the locking and the unlocking role, the contact role, the guiding role and the traction role.

The goal of variable flexibility tracks is three-fold. First, it can provide a big wheel radius allowing going beyond obstacles in a smooth manner. Second, it provides comfort to use upper part of a vehicle without constraints. Third, it serves as a shock absorber. Indeed, the flexible curve based on limited flexibility of metal and joints between the track pieces produce a cumulated effect of a spring absorbing shocks. Among other benefits one can mention easier folding of a vehicle, easier maintenance and reduced weight due to the fact that variable flexibility track plays several roles and thus reduced the vehicle weight.

The central point of the track is its ability to change from a rigid to a flexible state. This change operates on the level of track pieces which can be "locked" in certain range of positions by pairs or multiple locking mechanisms and form a rigid system.

Figure 3:
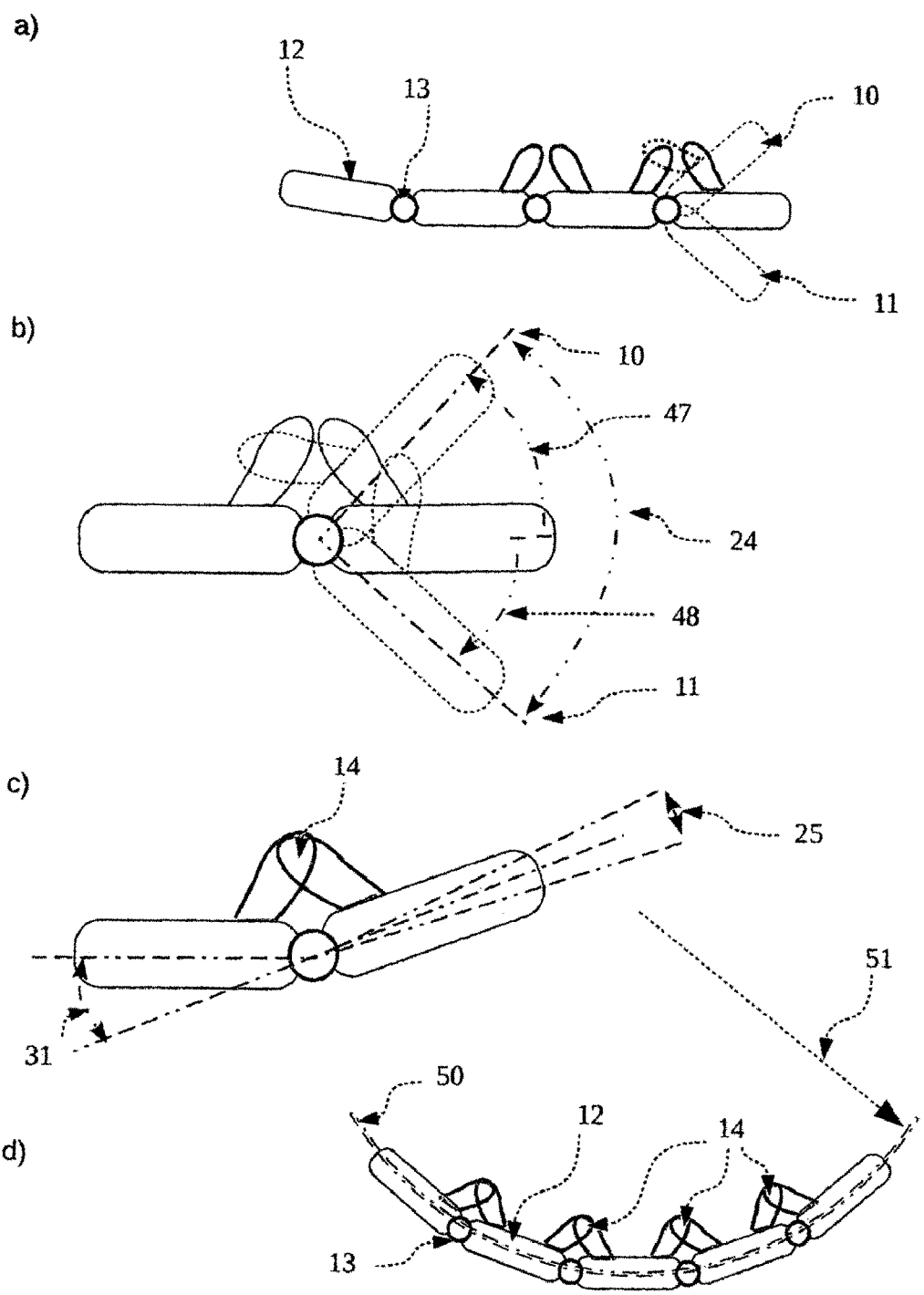
FIGS. 3a to 3d show a detailed track behavior according to an embodiment of the invention.

On FIG. 3a-3.c the general principle of the locking mechanism is presented (a side view is used across figure). In FIG. 3a a track is in the flexible state where multiple Track elements 12 are connected by multiple Track hinges 13. FIG. 3b shows a detailed view of two Track elements 12 that are not locked and can move in a Positive folding direction 47 and/or a Negative folding direction 48 to achieve Maximum positive folding 10 and a Maximum negative folding 11 limited by the Track hinge 13 only. The angle between the positive and the negative folding corresponds to an Unlocked flexibility angle range 24.

FIG. 3c shows a view off two Track elements 12 which are linked and blocked by a Locking mechanism 14 that limits the rotation of two Track elements 12 with respect to each other. The locking mechanism blocks the position of a Track element 12 at a certain Locked angle 31. The Locking mechanism 14 can have multiple steps of locking, thereby leading to various Locked angles 31. If the locking mechanisms between the multiple track elements are locked, the track will represent a semi-rigid structure of circular form with a certain curvature radius. In practice, the Locked angle 31 will not be fixed and will vary due to inherent flexibility of material from which elements are made, to the drift of the Track hinge 13 and the drift of the Locking mechanism 14 and the elasticity of the materials. Combined, those effects lead to a Locked flexibility angle range 25. This range will not exceed few degrees in general.

FIG. 3d is a general view of several Track element 12 that are locked between them. The semi-rigid structure is characterized by an Effective wheel curve 50 and an Effective wheel radius 51. Therefore, this semi-rigid structure can play a role of a wheel with a radius and rigidity that is controlled by the Locking mechanisms 14. Both properties are key to the invention which targets to obtain a foldable wheel with large radius and whose elasticity plays a role of a shock absorber. This curvature and radius vary because of the Locked flexibility angle range 25 and by locking the track its curvature varies in a certain range. It should be noted that locking could be positive to obtain circular curvature, but it could be also negative if it is necessary to keep track in inverted position.

Various configurations of Locking mechanism 14 embodiments are presented in FIG. 3a-3d, FIG. 4a-4c, FIG. 5a-5c, FIG. 6a-6b and FIG. 7a-7b. For simplicity of illustration on this and other figures we use three columns with representing a Side view 40 a Top view 41 and Front view 42. All solutions above summarize the possibility to have a principle of the "big wheel" realized with tracks.

Figure 4:
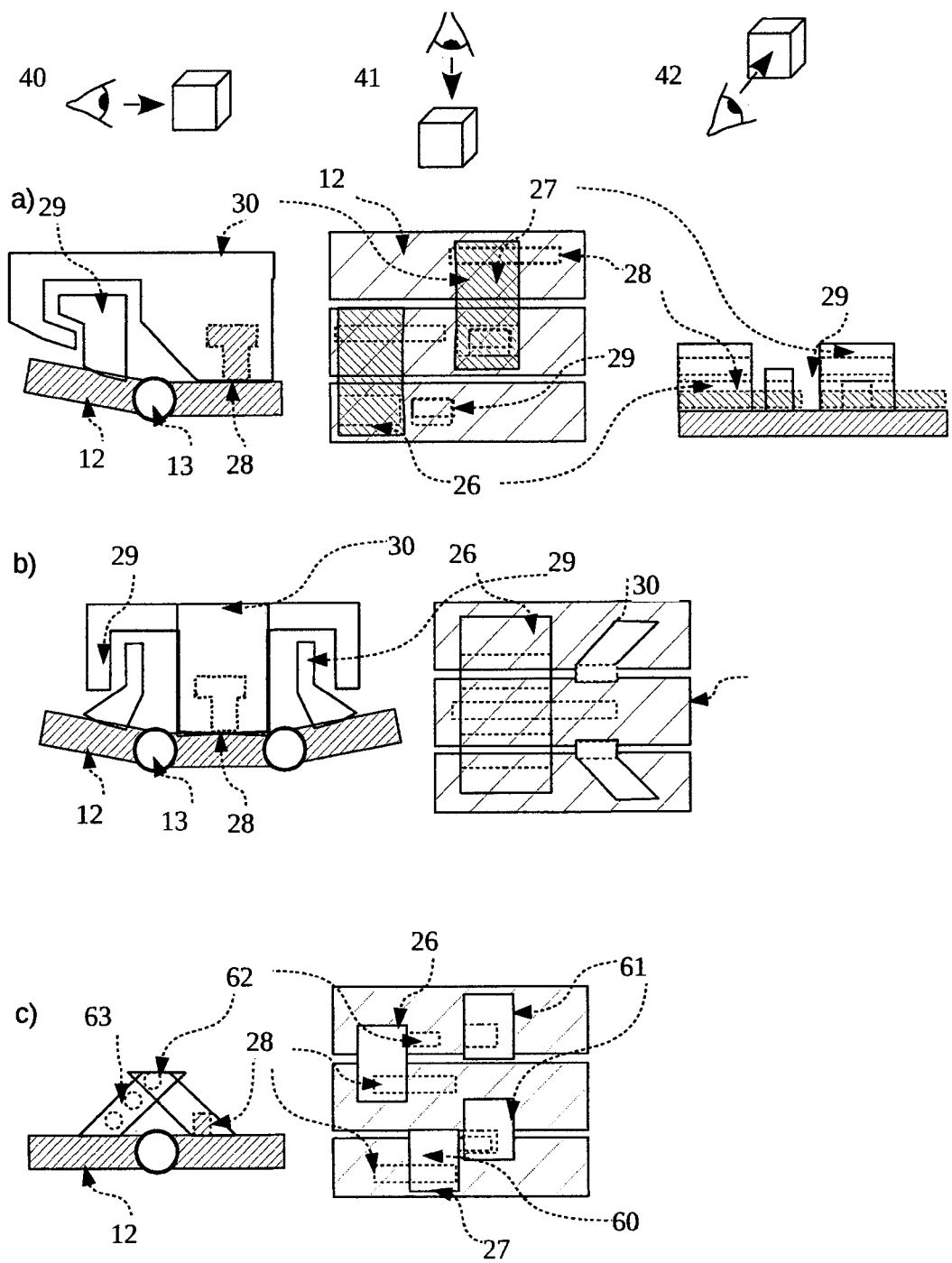
FIGS. 4a to 4c shows details of a locking mechanisms according to an embodiment of the invention.

Three configurations of locking mechanism of a sliding type are presented on FIG. 4a-4c. A configuration on FIG. 4a is where every Track element 12 bears a Locking element 30 that can move along a Guiding rail 28, have a form that completes a Fixed hook 29 and can enter into a rigid configuration of Locked position 27 with a Fixed hook 29 on another Track element 12.

When the Locking element 30 is in a central Locked position 27 it hooks to a Fixed hook 29 and makes two Track element 12 locked to each other. When the Locking element 30 is moved aside to an Unlocked position 26, the two Track element 12 are not locked any more and can move freely around the Track hinge 13 thus putting the track in its usual foldable state. The Locking element 30 also prevents that Track element 12 moves in the direction of Negative folding direction 48.

A configuration on FIG. 4b is similar to the previous solution. The difference resides in the fact that three Track element 12 are locked together.

In configuration on FIG. 4c one Track element 12 bears a Fixed element with holes 61 that is firmly fixed to the Track element 12 and has one or several Multiple locking hole 63. The second track element bears a Sliding element with rod 60 that moves along a Guiding rail 28 and has a Rod 62. At different angles between the two track elements, the Sliding element with rod 60 can move along the Guiding rail 28 and lock the two track elements by positioning the Rod 62 in one Multiple locking hole 63. The selected hole defines the angle between the two track elements. In an unlocked state, the Sliding element with rod 60 is in an Unlocked position 26 and the Track element 12 can move in the positive and the negative folding directions. When the Sliding element with rod 60 is in the Locked position 27, a hole of the Fixed element with holes 61 and the rod of the Sliding element with rod 60 are aligned and the Rod 62 goes into the Multiple locking hole 63. The Multiple locking hole 63 allow various angles of the locking mechanism.

Figure 5:
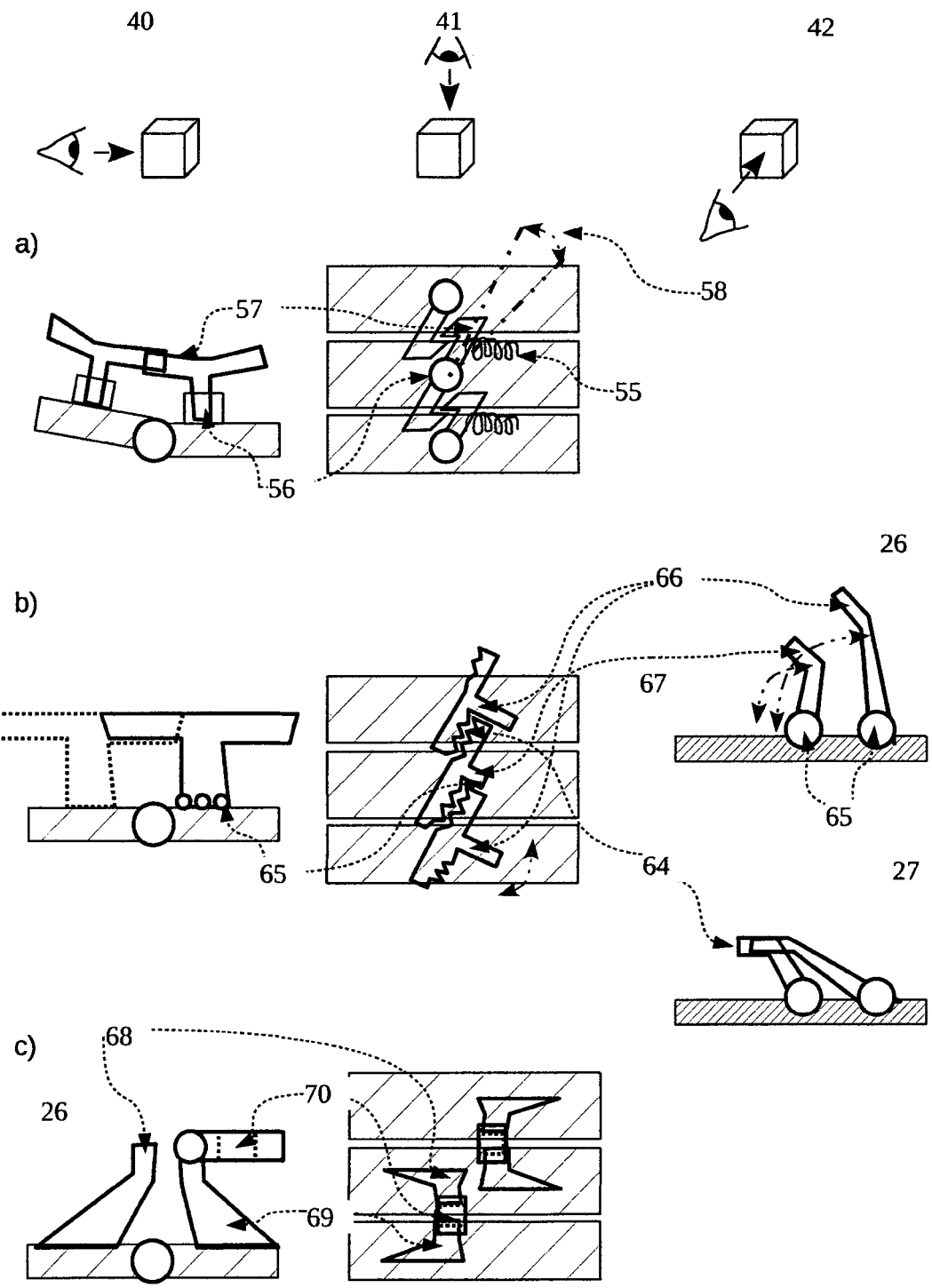
FIGS. 5a to 5c shows details of a locking mechanisms according to another embodiment of the invention.

On FIG. 5a-5c embodiments based on rotating locking mechanisms are presented. With first configuration shown on FIG. 5a every track element bears a Rotating hook 57 that rotates around an Axis 56 within a Rotating range 58 and whose position is conditioned by a Positioning spring 55. The Rotating hook 57 is made in such a form that by folding two track elements, the corresponding Rotating hooks 57 slide along each other due to their form and rotate around the Axis 56. At some point due to the effect of the Positioning spring 55 they lock in a position preventing the two track elements to move beyond certain angle. It should be noted that when the Rotating hook 57 of a previous track element is being fixed, the one of the next track element can still rotate.

FIG. 5b shows a configuration where the track elements bear clutches of two types. Both of them have a Cogwheel type surface 64. The first type of Big radius clutch 66 rotates around a Rotation hinge 65 that is positioned more towards the edge of the track element and has a bigger lever radius. A Small radius clutch 67 rotates around the Rotation hinge 65 that is positioned more towards the center of the track element and has a smaller lever radius. The two clutches can rotate around their hinges without disturbing each other passing from the Locked position 27 to the Unlocked position 26 (indicated with a dotted line). In this position the track elements are in unlocked position allowing free motion. When the Big radius clutch 66 and the Small radius clutch 67 are in the Locked position 27, their Cogwheel type surface 64 coincide and several track elements are in a locked position.

FIG. 5c shows a configuration where one track element bears a Fixed hook 68 and a second track element bears a Locking hook 69 that have a Rotating latch 70 that has one or more holes.

When the Rotating latch 70 is in the Unlocked position 26, the two track elements can move freely. When Rotating latch 70 is in the Locked position 27 the Rotating latch 70 rotates until its hole coincides with the Fixed hook 68 and the two track elements are in the locked position with respect to each other.

On FIG. 6a,6b embodiments based on double-chain approach are presented. FIG. 6a shows an embodiment where a Track element 12 rotates around Track hinge 13 and can be locked by a second chain also composed of an Element of second chain 74 with an Opening 75 rotating around a Hinge of second chain 73. The first main chain bears Forward pointing hook 76 and Backward pointing hook 77. To reach a locking position, two elements of the first chain are folded so that tips of the two hooks of adjacent elements align and can be passed into the Opening 75 of the Element of second chain 74 by lowering the second chain on the first. Then by unfolding the two elements of the track tips of the two hooks are locked in the Opening 75 due to their form and are set in a locked position. If the Opening 75 thas several separated holes, locking is possible at various angles and at negative folding as well (e.g. necessary to keep the track having a specific form on it upper side with respect to rollers).

FIG. 6b shows an embodiment where the track elements contains the same Forward pointing hook 76 and Backward pointing hook 77. The second upper chain contains a locking element being a Dovetail hook 78 to keep the track elements in a locked position. It operates in a similar way as the previous solution. The two elements of the track need to be folded to align two hooks and let them enter into the Dovetail hook 78 of the second chain by lowering it. Once done, the track elements unfolds and lock themselves reaching the situation shown on the figure where two hooks of the first main chain are locked in the Dovetail hook 78 of the second chain. The form of Dovetail hook 78 also prevents negative folding.

On FIG. 7a and FIG. 7b two other embodiments are presented. With embodiment on FIG. 7a a locking mechanism is placed inside a hinge linking two Track elements 12 that have each half of a Cylindrical part of hinge 84. The cylindrical parts rotate around an Axis with tips 85 that rotates in an Axis space 86 and can also shift in the direction of its axis of rotation. The Axis with tips 85 contains a First tip on axis 79 that is positioned in a First locking hole 87 of the first cylindrical part of the first track element and can only shift in axis direction but not rotate. Therefore the Axis with tips 85 and first that track element can not rotate with respect to each other. The axis also contains a Second tip on axis 80 that can freely move in a Corridor of rotation 88 which represent a wider space over 360 degrees around the axis. The Corridor of rotation 88 allows the cylindrical part of the second hinge to rotate around the axis.

When the second track element is positioned at a certain angle with respect to the first track element, a Second tip on axis 80 is aligned with a Second locking hole 89 that is present in the Axis space 86 at certain angle only (as First tip on axis 79). The Axis with tips 85 can then be shifted to a position where the First locking hole 87 coincides with the Second locking hole 89. The Axis with tips 85 is then locked with respect to both cylindrical parts of the hinge. The two track elements and the axis become a rigid system where elements stay at a defined angle with respect to each other. Multiple Second locking holes 89 can provide multiple locking angles of the track elements. Shifting of the Axis with tips 85 can be reached by mechanically shifting as in clutch, or using contactless force (f.ex. Magnetic). In the latter case axis is more protected from dust.

In embodiment shown on FIG. 7b the first track element contains a Cogwheel 93 and the second track element contains a Cog 91. When two track elements are folded, the Cog 91 advances and rotates the Cogwheel 93 around an Axis 92. A Spring for clutch 94 is in contact with Cogwheel 93 and allows its rotation in one direction only. A Locking clutch 95 prevents the Cog 91 to advance beyond certain limit and locks the two track elements at specific angle because the Spring for clutch 94 prevents the Cogwheel 93 from backward rotation. To unlock the system and return to flexible folding of the track elements, the Spring for clutch 94 should be moved aside.

Figure 8:
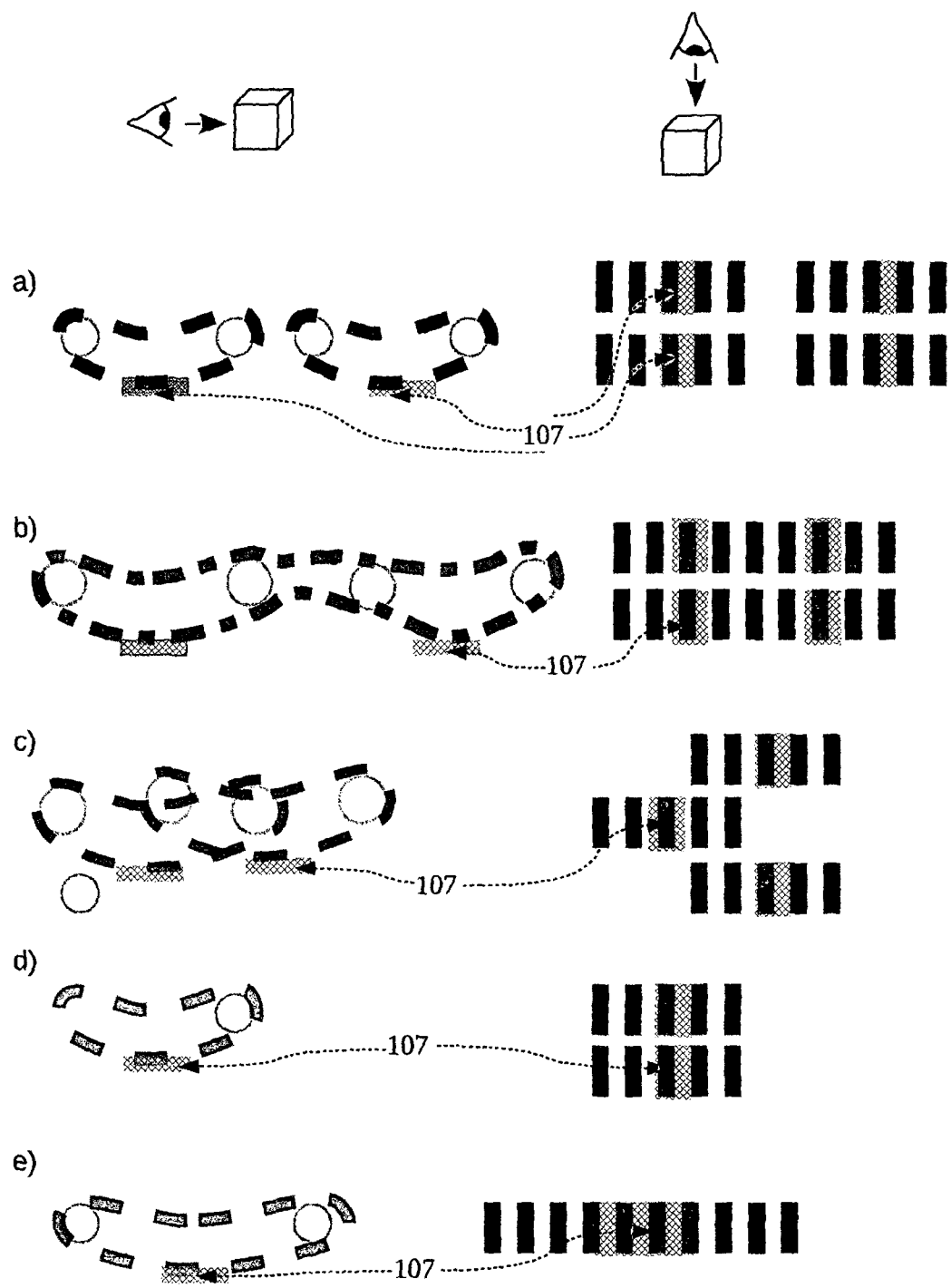
FIG. 8a to 8e show various configurations of tracks according to an embodiment of the invention.

Various embodiments of tracks assemblies are illustrated on FIG. 8. In the most prominent embodiment shown on FIG. 8a the number of tracks is four and they provide four Contact point with the ground 107 as in a normal four-wheel car or a motorcycle. Four-point contact provides maximum stability for necessary maneuvers that will be performed. Each track is guided by two rollers resulting eight rollers. A second embodiment shown on FIG. 8b illustrates a combination of two tracks, but involves still eight rollers and still deliver four points of contact. Third embodiment is shown on FIG. 8c where three tracks are involved and three Contact point with the ground 107 are achieved. This configuration is less stable that four point of contact. Fourth embodiment shown on FIG. 8d features two tracks with two Contact point with the ground 107 are used. The equilibrium of the vehicle will also be reached with mechanisms maintaining stability with gyroscopes for example. Finally, an embodiment shown on FIG. 8e can be used like a skateboard. This solution will benefit from a larger Contact point with the ground 107 and a special turning mechanism.

Figure 6:
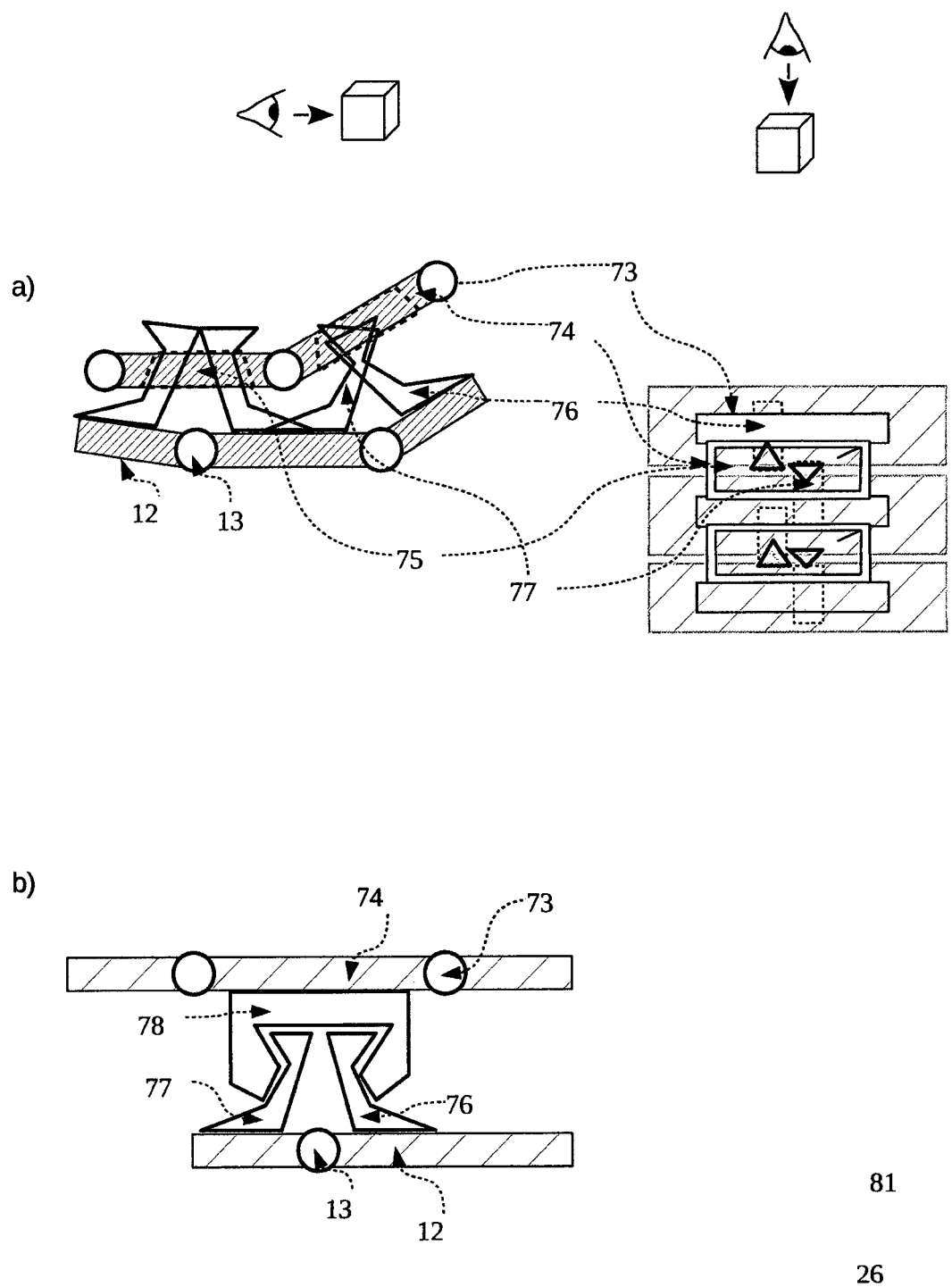
FIGS. 6a and 6b show details of a locking mechanisms according to still another embodiment of the invention.
Figure 7:
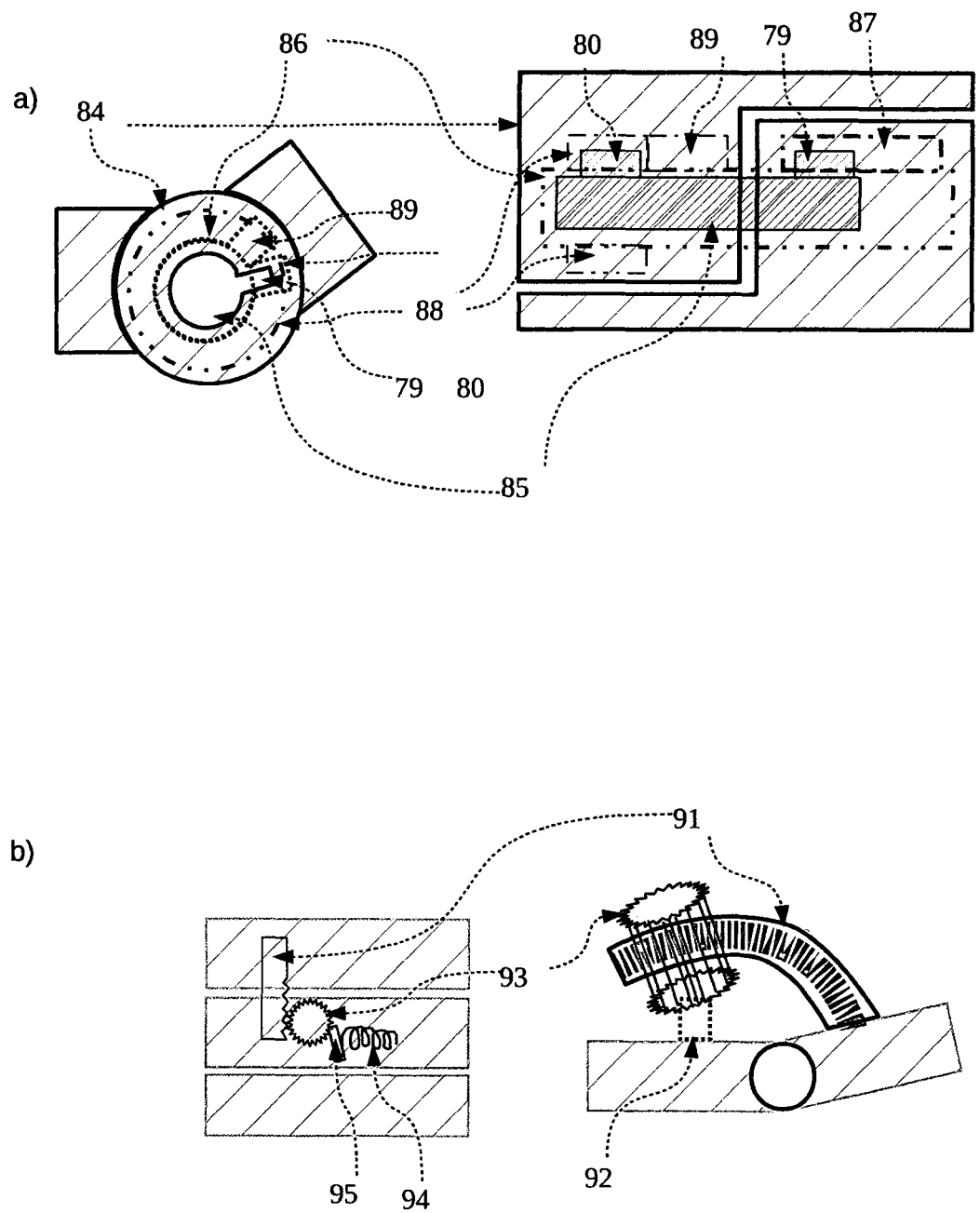
FIGS. 7a and 7b show details of a locking mechanisms according to still another embodiment of the invention.
Figure 9:
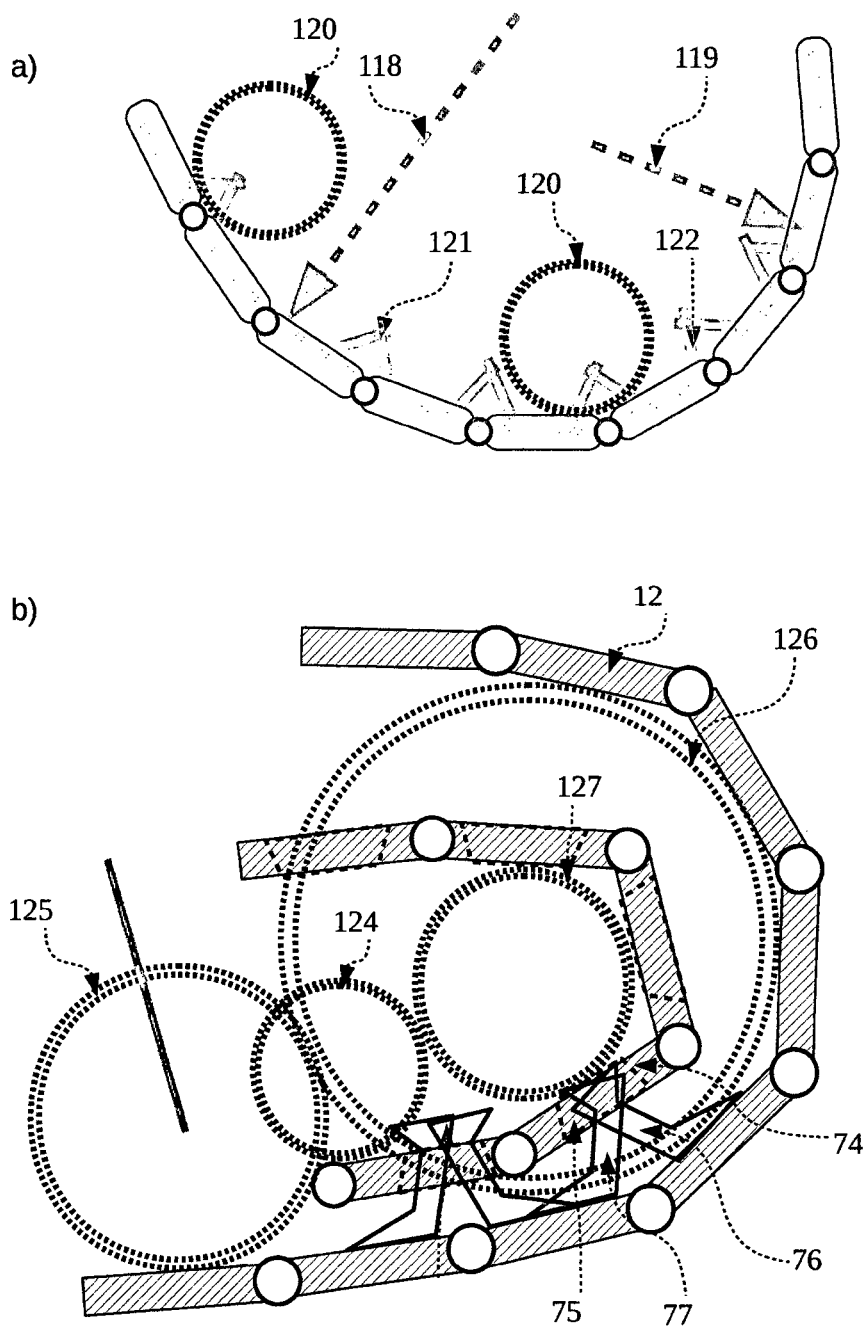
FIGS. 9a and 9b show track curvature changing methods according to an embodiment of the invention.

On FIG. 9a a locking process is illustrated for the locking mechanism of type shown on FIG. 6) where a locking chain is used to lock the track.

The vehicle leans on a Lean roller for track 125 that rolls on track in already locked state. Therefore, the vehicle weight is transmitted to those rollers which transmit this weight to rigid track which in turn with its inherent flexibility lean on the ground. Bigger the lean rollers, smother the motion but track folding radius is a constraint.

To convert a track to a rigid state other elements are required. An Encoding roller for track 126 positions adjacent track elements at specified angle with respect to each other and a specified position with respect to a locking chain. An Encoding roller for chain 127 positions the chain so that an Element of second chain 74 position and angle allows that a Forward pointing hook 76 and a Backward pointing hook 77 can enter into an Opening 75 of the locking chain coinciding with track hooks. The locking occurs by lowering the chain on the track to overlay opening on the hooks and further unfolding of the track with a Lean roller for track 125 and a Guiding roller for chain 124. The correct locking occurs at specific position of two rollers.

Figure 10:
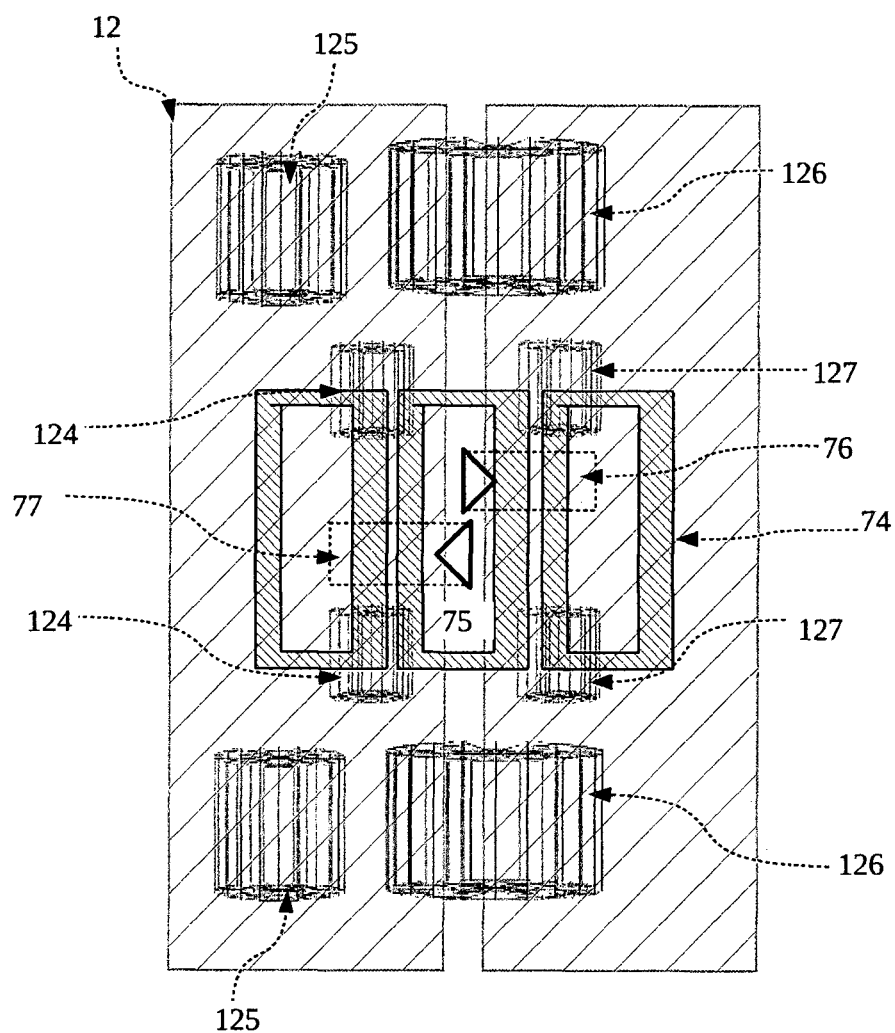
FIG. 10 is a schematic upper view of a track locking operation according to an embodiment of the invention.

A top view of the rollers positions is explained on FIG. 10. A platform leans on Lean roller for track 125. The Encoding roller for track 126 and the Encoding roller for chain 127 are positioned so that to achieve locking effect. Track elements and their Forward pointing hook 76 and Backward pointing hook 77 are positioned with respect to the Element of second chain 74 so that they can enter into the Opening 75 at a specific time. Then, the Guiding roller for chain 124 unfold the locking chain and when the Lean roller for track 125 is in contact with rigidly locked track elements, it's already a rigid system.

Various functionalities of a track derive from its ability to change curvature and are explained on FIG. 9b. A Roller 120 (or system of rollers as explained above) can set the angle of locking mechanism for every pair of track elements from a Locking mechanism position one 121 to a Locking mechanism position two 122 (and vice versa depending on the direction of motion). The combined effect of angles between individual track elements is the change of a curvature of the track from a Larger radius 118 to a Smaller radius 119.

A change of curvature occurs in various embodiments adapted for each locking mechanism. For locking mechanism as shown on FIG. 7 and FIG. 9 a first embodiment is that track does not change and bears a Forward pointing hook 76 and a Backward pointing hook 77 but angle at which they are blocked is controlled by the Opening 75 of locking chain. The Element of second chain 74 could have openings of several sizes that would block hooks of the track at different angles. Size of such openings are controlled for example by sliding elements reducing the opening or that opening has various gradations of gaps and by positioning the locking chain hooks are locked at desired angles. Another embodiment is where opening remains the same, but hooks have several steps at different heights which with same opening of locking chain would correspond to different angles of locking between track elements. The advantage of the second embodiment is a difference in lever allowing to lock track elements at more open angles with bigger lever (where more force is needed) and at higher curvatures (where less force is needed) the lever is smaller.

Figure 11:
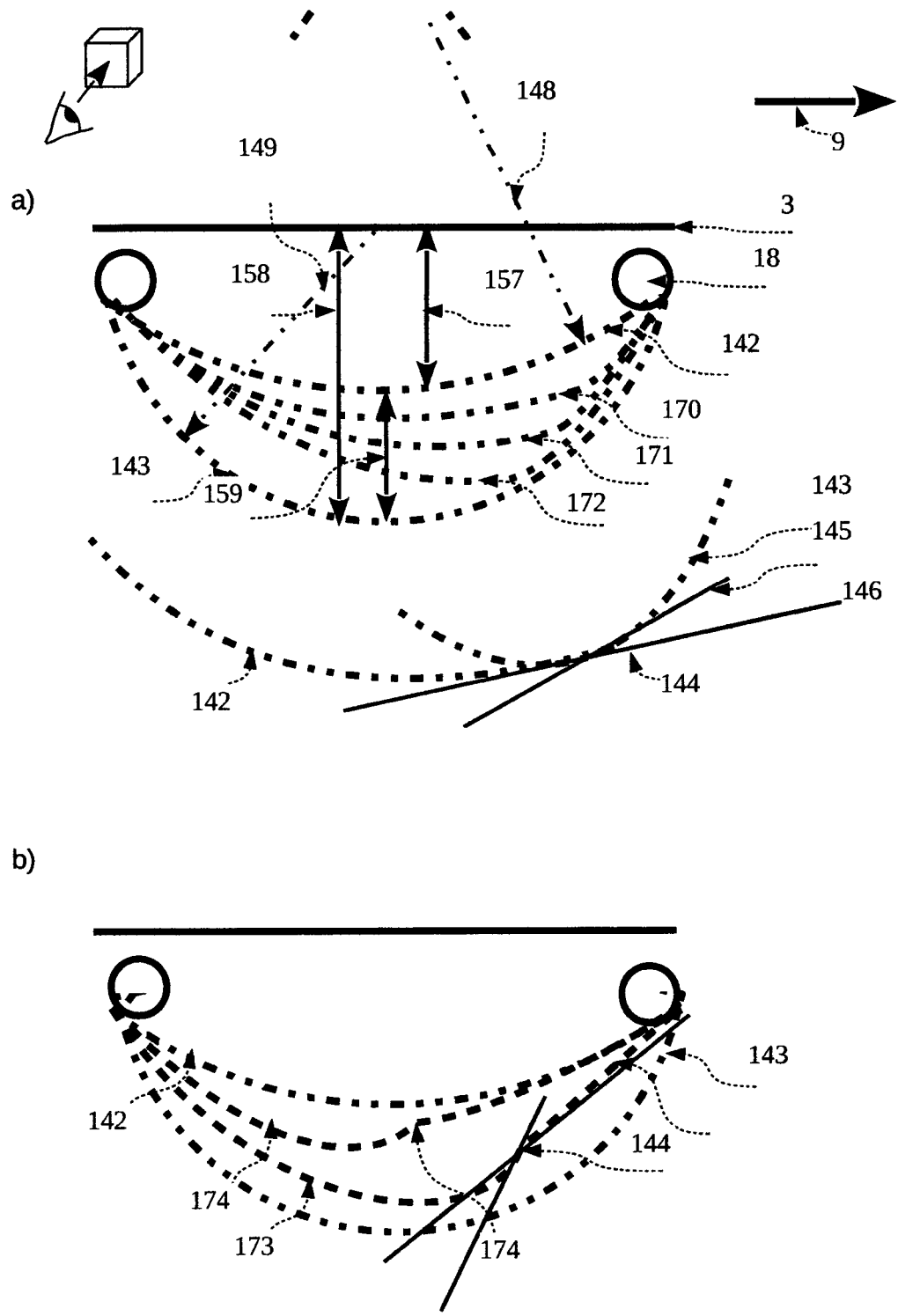
FIGS. 11a and 11b illustrate the effect of changed curvature on track motion of the device according to the invention.

The effect of curvature change is explained on FIG. 11a,b where the Standing platform 3 of the vehicle moves in the Direction of motion 9. A curvature increase transition with side view of the platform is shown on FIG. 11a.

The original track form is a High curvature with small radius 143 and track is locked at its Big radius of low curvature 148. This configuration provides that position is Platform height at low curvature 157 above the ground.

The result of the operation is a Low curvature with big radius 142 where track is locked at its Small radius of high curvature 149 and Platform height at high curvature 158 above the ground.

Thus, the platform changes its height above the ground by a Height difference 159 between two states of high and low track curvature. Changing height of the platform or one of the tracks provides very useful functionality in various drivability scenarios.

A transitions between a Low curvature with big radius 142 and a High curvature with small radius 143 occurs across one half-cycle of track rotation around rollers. When curvature change is required, a Controlling roller 18 starts to change the curvature of the track. Intermediate states of the track are shown on FIG. 11a, FIG. 11b and FIG. 11c. In each of those states the track has one part of low curvature and one part of high curvature separated by a Joint point 144.

To avoid an "angle" between two curvature areas at the Joint point 144 and thus a "bump" effect in motion, a Tangent bigger curvature 145 and a Tangent smaller curvature 146 have to be equal in the Joint point 144. This can be reached by intermediate locking angle between two track elements that provides equal tangents of two circular segments of the track have and thus a smooth junction.

A curvature decrease effect shown on FIG. 11b has a reverse effect. Let's assume that motion occurs in the same direction. The track goes from a High curvature with small radius 143 to a Low curvature with big radius 142 and the radius goes from a Small radius of high curvature 149 to a Big radius of low curvature 148. Subsequently platform (or track alone) goes from bigger height to lower height.

The operation of change goes through intermediate states: Intermediate track state four 173, Intermediate track state five 174. A forward roller first changes the curvature of the Joint point 144 with given angle between track elements and continues to do so at High curvature with small radius 143. Here, achieving smoothness between two circular parts of the track with different radiuses is unlikely and a Tangent bigger curvature 145 and a Tangent smaller curvature 146 can not be equal because of negative angle. Further, the track gradually passes from a Intermediate track state four 173 to an Intermediate track state five 174 and at the end to a Low curvature with big radius 142.

Figure 12:
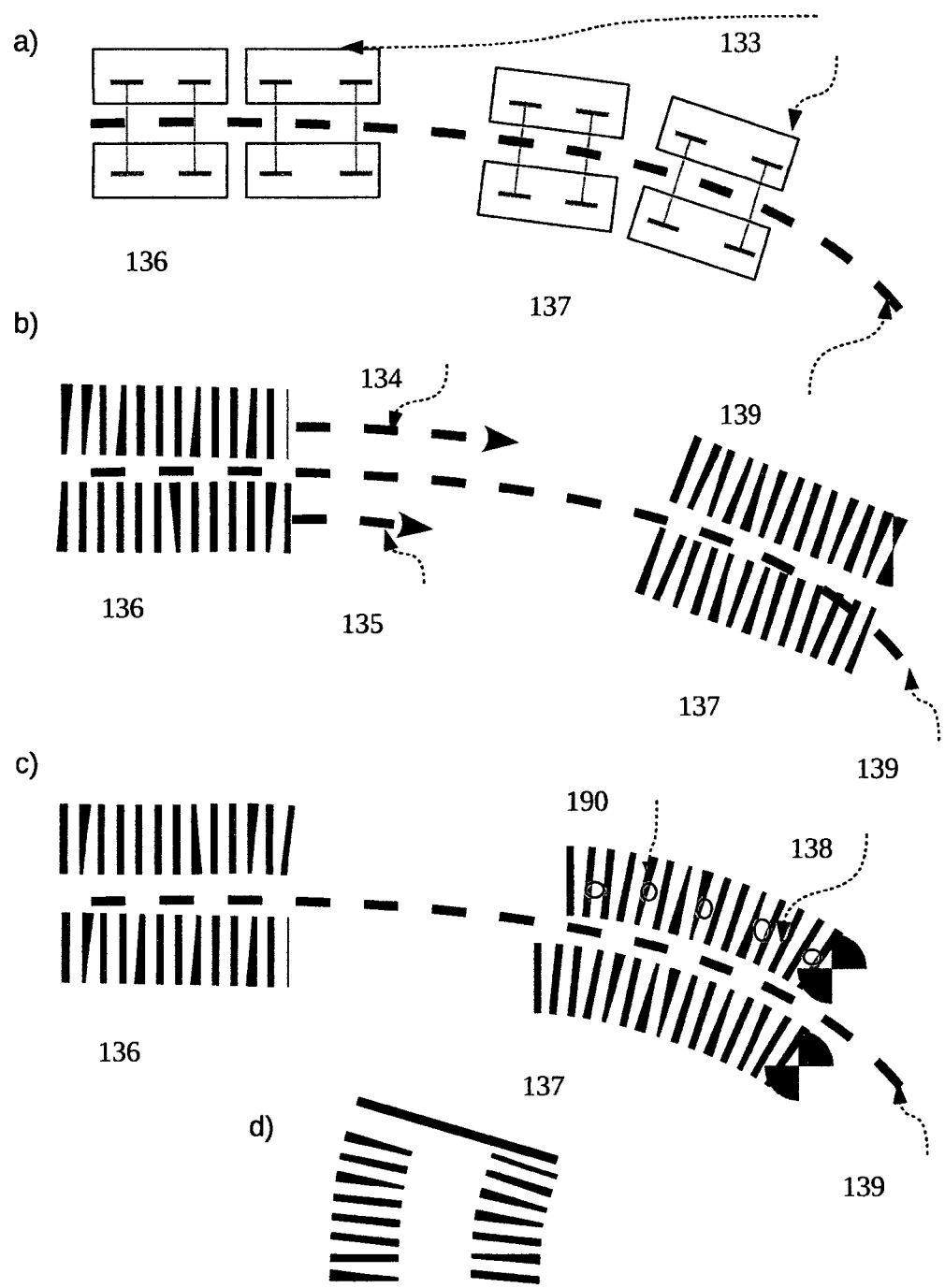
FIGS. 12a to 12d shows various steering embodiments according to the invention.
Figure 13:
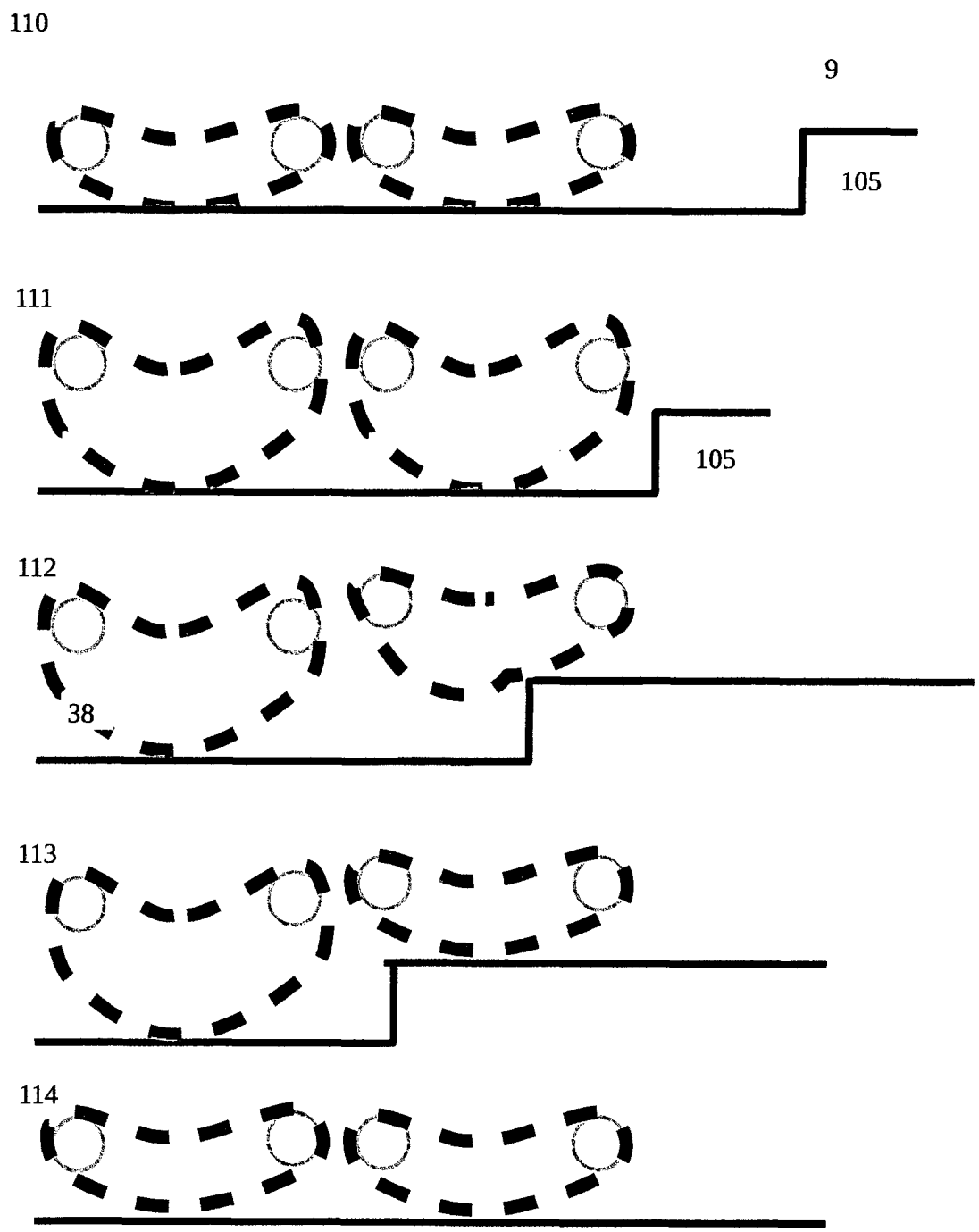
FIG. 13 illustrates how to overcome obstacles as sidewalk step with the device according to the invention.

The FIG. 12a-c explains three various turning options for a vehicle where three turning methods are present. For each method a Position before turning 136 and a Position after turning 137 are shown as well as a Rotating trajectory 139.

A first turning method shown in FIG. 12*a* implies configuration of four tracks or two tracks one after another as shown in the Position before turning 136. The forward pair of tracks or First pair of track rotates 133 turns to follow the Rotating trajectory 139 as a normal four-wheel car would do. A second turning method shown in shown in FIG. 12*b* implies that at the Position before turning 136 the Speed of outer track 134 becomes higher respectively to Speed of inner track 135. Therefore, Position after turning 137 follows the Rotating trajectory 139 similar to tanks. A third turning method shown in shown in FIG. 12*c* implies that at the Position before turning 136 the two tracks deform in the direction Rotating trajectory 139 to reach Deformed curved state 138. This can be achieved with Additional hinges 190 between the track elements.

For all three turning methods, to take turns at rather high speed with comfort for a user, inclination of the platform is possible by having an additional effect of one track changing its curvature and thus lifting one side of the platform leading to inclination of standing or sitting passenger as shown in Platform inclination 189.

The FIG. 13*a-e* explain the use of track curvature change to overcome boardwalk steps in a city. At a time moment shown on FIG. 13*a* the four track configuration (seen from the side) moves in Direction of motion 9 where it approaches a Sidewalk step 105. View is fixed on the tracks meaning that ground moves leftwards. At a moment shown on FIG. 13*b* both tracks change their curvature to heighten the position of the platform before touching Sidewalk step 105. At a moment shown on the FIG. 13*c* where first track touches the Sidewalk step 105 the first track starts to change its curvature to normal. At a moment shown on FIG. 13*d* the first track is now present on the Sidewalk step 105 level with normal curvature and the second track is at lower level with its higher curvature. At a moment shown on FIG. 13*e* the second track follows the same behavior as the first one and ends on Sidewalk step 105 with the lower curvature.

Figure 14:
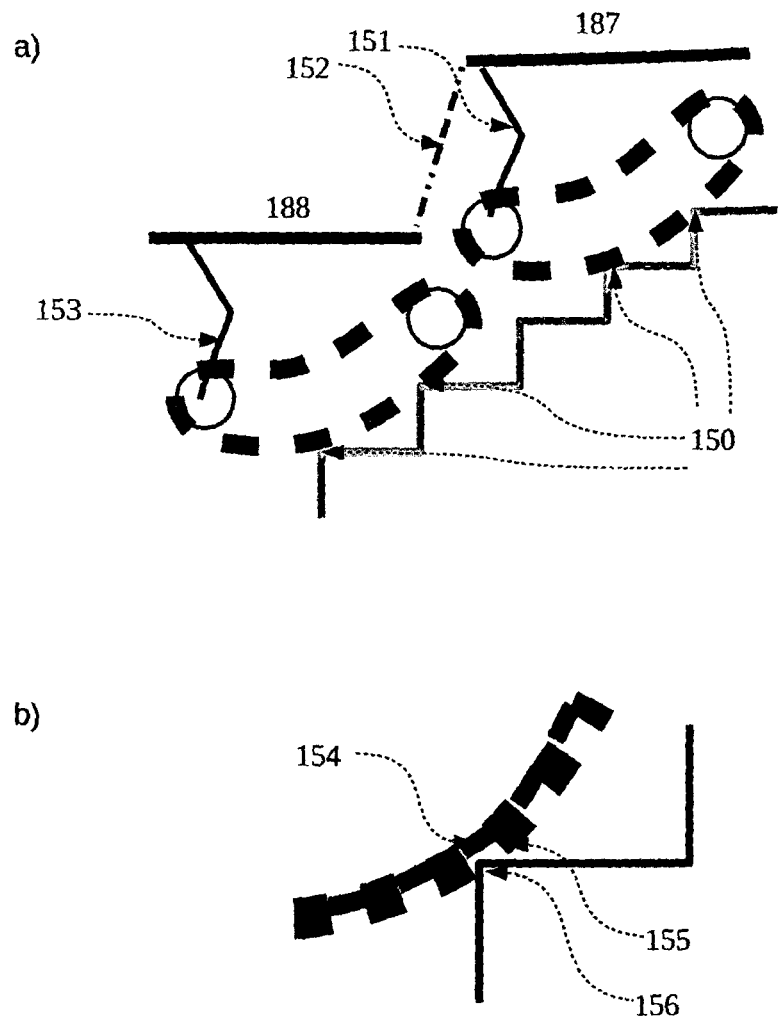
FIG. 14 shows the mounting of a staircase with the device according to the invention.

The FIG. 14 explains the way a platform of four tracks can optionally move on stairs. There are several embodiments where tracks can change curvature and lift rear part of the platform to maintain the driver at best possible horizontal orientation with respect to stairs inclination. The most comfortable solution seems, however, to be achieved with a mode illustrated on the figure where a platform splits into a section First section 187 and a Second section 188. At the moment of reaching a stairs the two tracks (on one side) achieve four Contact point with staircase 150. At the same time the Lifting step of first section 151 raises as well as the Lifting step of second section 153. To avoid injuries, the Extending floor 152 bridges the space between two sections at the same way as escalator. The platform remains horizontal and composed of two sections.

To increase adherence with stairs the track elements can have a Low grip 154 and High grip 155 making Contact gripping point 156 much more stable (shown on lower part of the figure).

Figure 15:
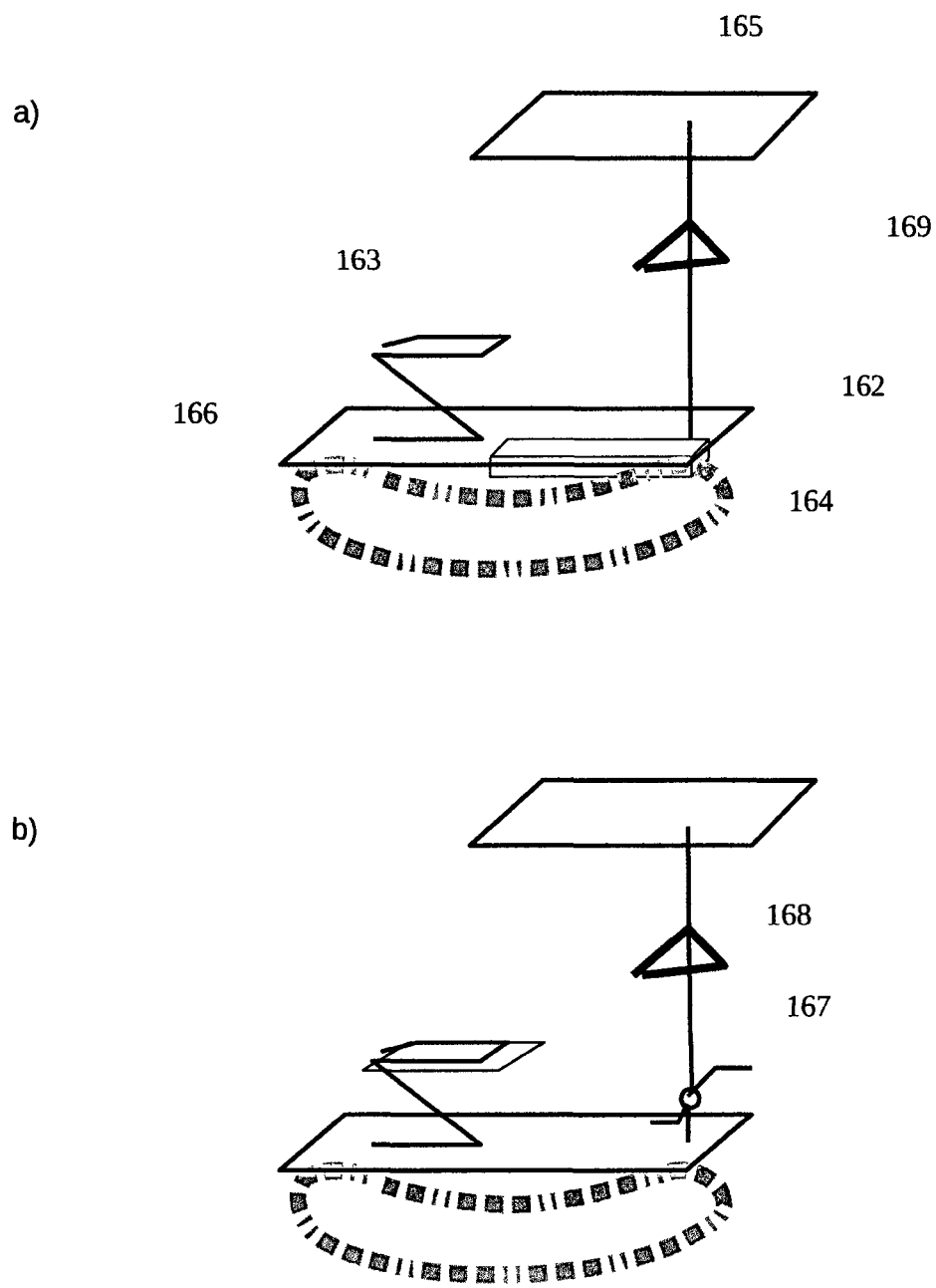
FIGS. 15a and 15b shows various embodiments of the invention.

The FIG. 15*a-b* show some optional comfort elements of the invention. In the Motor version of the vehicle 160 the platform remains flat for the driver and the luggage. The Motor 162 is beneath the platform. In case of electric motor an option is to have the Battery 164 located directly below the platform near the motor or in the track elements. This would make the weight supported by tracks and rollers lower.

In Bicycle version of the vehicle 161, the Pedals 167 remain in front and can be connected to front roller with changing speeds. In both versions the Guiding pad 168 allows controlling direction of the vehicle, changing gears, a reverse motion, making the vehicle rotate around its vertical axis, etc. An Umbrella 165 or holder for normal umbrella would protect from rain and can be attached to the same vertical stand as the control pad or be more towards rear of the vehicle (and be foldable). For comfort, the Seat 163 can be foldable and allow luggage beneath. Additional elements like Barrier 166 to lean upon can be provided.

The vehicle can contain usual elements like lights, etc. In one embodiment the front lights would include laser pointers projecting lines and curves on the ground, said lines and curves indicating the trajectory of the vehicle and its dimensions corridor. With two curves lines on the ground, driver can have a clear understanding where the vehicle is advancing and if it passes between two trees and if its turn trajectory is compatible with obstacles.

LIST OF REFERENCES

1 Personal mobility vehicle
2 Variable flexibility track
3 Standing platform
4 Guiding device
5 Optional seat
6 Controlling rollers
7 Motor or pedals
8 _f
9 Direction of motion
10 Maximum positive folding
11 Maximum negative folding
12 Track element
13 Track hinge
14 Locking mechanism
15 Rigid state
16 Unlocking state
17 Flexible state
18 Controlling roller
19 Controlling roller
20 _twenty
21 _twentyone
22 _twentytwo
23 _twentythree
24 Unlocked flexibility angle range
25 Locked flexibility angle range
26 Unlocked position
27 Locked position
28 Guiding rail
29 Fixed hook
30 Locking element
31 Locked angle
32 Weight
33 Elasticity
34 Pressure
35 Rolling pressure
36 Rigid track elasticity
37 Pressure
38 Radius of effective wheel
39 d_
40 Side view
41 Top view
42 Front view
43 _fourtythree
44 _fourtyfour
45 _fourtyfive 46 Blocking tip
47 Positive folding direction
48 Negative folding direction
49 _
50 Effective wheel curve
51 Effective wheel radius
52 _fiftytwo
53 _fiftythree
54 _flftyfour
55 Positioning spring
56 Axis
57 Rotating hook
58 Rotating range
59 _
60 Sliding element with rod
61 Fixed element with holes
62 Rod
63 Multiple locking hole
64 Cogwheel type surface
65 Rotation hinge
66 Big radius clutch
67 Small radius clutch
68 Fixed hook
69 Locking hook
70 Rotating latch
71 _seventyone
72 _seventytwo
73 Hinge of second chain
74 Element of second chain
75 Opening
76 Forward pointing hook
77 Backward pointing hook
78 Dovetail hook
79 First tip on axis
80 Second tip on axis
81 Locking plae
82 _eightytwo
83 _eightythree
84 Cylindrical part of hinge
85 Axis with tips
86 Axis space
87 First locking hole
88 Corridor of rotation
89 Second locking hole
90 Rotation space for axis USED
91 Cog
92 Axis
93 Cogwheel
94 Spring for clutch
95 Locking clutch
96 First turning mechanism
97 Road axis
98 Outer tracks faster
99 Outer tracks higher
100 _hundred
101 _hundred_one
102 _hundredtwo
103 _hundredthree
104 One-track configuration
105 Sidewalk step
106 OneHundredSix
107 Contact point with the ground
108
109
110 Time moment one
111 Time moment two
112 Time moment three
113 Time moment four
114 Time moment five
115
116
117 _hundredseventeen
118 Larger radius
119 Smaller radius
120 Roller
121 Locking mechanism position one
122 Locking mechanism position two
123 _hundredtwentythree
124 Guiding roller for chain
125 Lean roller for track
126 Encoding roller for track
127 Encoding roller for chain
128 OneHundredTwentyEight
129 OneHundredTWentyNine
130 _hundredthirty
131 _hundredthrtyone
132 _hundredthirtytwo
133 First pair of track rotates
134 Speed of outer track
135 Speed of inner track
136 Position before turning
137 Position after turning
138 Deformed curved state
139 Rotating trajectory
140 _hundredfourty
141 _hundredfourtyone
142 Low curvature with big radius
143 High curvature with small radius
144 Joint point
145 Tangent bigger curvature
146 Tangent smaller curvature
147 Decrease of curvature
148 Big radius of low curvature
149 Small radius of high curvature
150 Contact point with staircase
151 Lifting step of first section
152 Extending floor
153 Lifting step of second section
154 Low grip
155 High grip
156 Contact gripping point
157 Platform height at low curvature
158 Platform height at high curvature
159 Height difference
160 Motor version of the vehicle
161 Bicycle version of the vehicle
162 Motor
163 Seat
164 Battery
165 Umbrella
166 Barrier
167 Pedals
168 Guiding pad
169
170 _hundredseventy
171 Intermediate track state two
172 Intermediate track state three
173 Intermediate track state four
174 Intermediate track state five
175 One hundred seventy five
176 One hundred seventy six
177 One hundred seventy seven
178 One hundred seventy eight
179 One hundred seventy nine 180 One hundred eighty
181 One hundred eighty one
182 One hundred eighty two
183 One hundred eighty three
184 One hundred eighty four
185 One hundred eighty five
186 One hundred eighty six
187 First section
188 Second section
189 Platform inclination
190 Additional hinges

The invention claimed is:

1. A mobile system including at least one variable flexibility track and at least two rollers around which the variable flexibility track is wrapped, wherein the rollers are adapted to change the rigidity and the curvature of the variable flexibility track to modify its shape so as to be a wheel or to have a part corresponding to a circular wheel with different curvature or to be foldable, said variable flexibility track being composed of:
- a plurality of track elements and hinge-like portions linking said plurality of track elements so as to allow rotation of the track elements with respect to each other around the corresponding hinge-like portion; and
- a locking mechanism on each track elements that allows locking a position of the track elements with respect to the adjacent ones at various angles; and said rollers being in contact with the variable flexibility track and comprising at least one of:
  - a mechanism that interacts with the locking mechanism of each track element to change the rigidity of the variable flexibility track that can be present within the variable flexibility track within the rollers;
  - a mechanism for changing a curvature or a relative position of the variable flexibility tracks to allow navigation on stairs and cross other obstacles; or
  - a mechanism for steering the mobile system by applying different speed and/or curvature to the variable flexibility tracks.

2. The mobile system according to claim 1, wherein the rollers are guiding elements of the variable flexibility tracks and can lock the track elements between them at different angles.

3. The mobile system according to claim 1, adapted to a produce a given curvature circular rigid element on a lower part of the variable flexibility track that corresponds to a wheel, while an upper part of the variable flexibility track remains flexible and does not occupy space above the rollers.

4. The mobile system according to claim 1, that is composed of various variable flexibility track configurations comprising: one variable flexibility track for a "skate-type" motion; two variable flexibility tracks for a "segway-type" navigation; or three, four or more variable flexibility tracks for stable motion like in a personal platform or a car-like vehicle.

5. A personal mobility vehicle comprising the mobile system according to claim 1, and further comprising:
- a standing platform in contact with the rollers to support operational charge of the vehicle;
- a propulsion activation mechanism such as a motor, pedals or electrical activation mechanism;
- a guiding control pad on a rigid stand allowing control of the vehicle; and
- laser indicators that project laser patterns that correspond to expected trajectory of the vehicle and possible breaking distance.

6. The personal mobility vehicle according to claim 5, wherein the propulsion activation mechanism comprises pedals that are mechanically connected to the rollers and allow movement of the vehicle by pedaling, or a gasoline or electrical motor located under or above the platform and connected to rollers and controlled by the driver.

7. The personal mobility vehicle according to claim 5, wherein a mechanism for turning the vehicle is realized by turning at least a part of the variable flexibility tracks, by changing the speed of variable flexibility tracks, or by deforming the variable flexibility tracks to form a curve.

8. The personal mobility vehicle according to claim 5, wherein a mechanism to navigate on stairs for personal vehicle is realized by changing a curvature of variable flexibility tracks or by changing the shape of the platform.

9. The personal mobility vehicle according to claim 6, where if the motor is the electrical motor, batteries of the electrical motor are located inside the track elements to reduce weight on the rollers.

10. A method for piloting the personal mobility vehicle according to claim 5, said method comprising the steps of:
- determining a position, speed, inclination, upcoming obstacle type and user position with respect to said personal mobility vehicle;
- adapting a geometry, curvature, or speed of the variable flexibility tracks or platform; and
- projecting on a road laser patterns indicating expected trajectory of the personal mobility vehicle to inform a user about feasibility of the expected trajectory and breaking distance.

* * * * *